United States Patent [19]

Lichti

[11] 4,422,554

[45] Dec. 27, 1983

[54] MECHANIZED RETRIEVABLE HORIZONTAL STORAGE RACK

[76] Inventor: Robert D. Lichti, 3318 Warwood Rd., Lakewood, Calif. 90712

[21] Appl. No.: 279,432

[22] Filed: Jul. 1, 1981

[51] Int. Cl.$^3$ .............................................. A47F 3/08
[52] U.S. Cl. ................................... 211/1.5; 198/472; 211/122; 312/97; 312/268; 414/331
[58] Field of Search ....................... 211/1.5, 122, 121; 198/648, 472; 414/331; 312/91, 97, 268

[56] References Cited

U.S. PATENT DOCUMENTS

| | | | |
|---|---|---|---|
| 2,789,683 | 10/1953 | Stahl | 198/472 X |
| 3,117,668 | 1/1964 | Weihe, Jr. et al. | 198/648 |
| 3,278,052 | 10/1966 | Lichti | 414/251 |
| 3,424,321 | 1/1969 | Lichti | 414/251 |
| 3,442,564 | 5/1969 | Gutting | 312/97 X |
| 3,547,281 | 12/1970 | Lichti | 198/371 X |
| 3,656,608 | 4/1972 | Lichti | 414/251 X |
| 3,780,852 | 12/1973 | Weiss et al. | 414/331 |
| 3,817,391 | 6/1974 | Lohneis et al. | 211/1.5 |
| 4,196,812 | 4/1980 | McInnis | 211/194 |

Primary Examiner—J. Franklin Foss
Assistant Examiner—David L. Talbott
Attorney, Agent, or Firm—Vernon D. Beehler

[57] ABSTRACT

A mechanized rack assembly for the storage of items of virtually any identity makes use of a centrally disposed frame for supporting a multiple number of stacks of vertically spaced trays arranged to travel around the frame. Each stack is jointed to adjacent stacks, the stacks thus forming, in effect, an endless chain, there being a motor for driving the endless chain in a horizontal path around the frame. For movably supporting each stack there is a roller at the base of the stack which travels along tracks at the sides of the frame and travels around a rotating platform at each end. The endless chain is driven in a manner such that it can be halted with any one of the stacks stopped at the end of the frame with trays facing outwardly so that an unloader can remove the stored items from any one or more of the trays on that stack. Frames with their complement of stacks and trays can be stacked one above the other and a multiple number of such composite stacks accommodated side by side in a single warehouse space.

23 Claims, 13 Drawing Figures

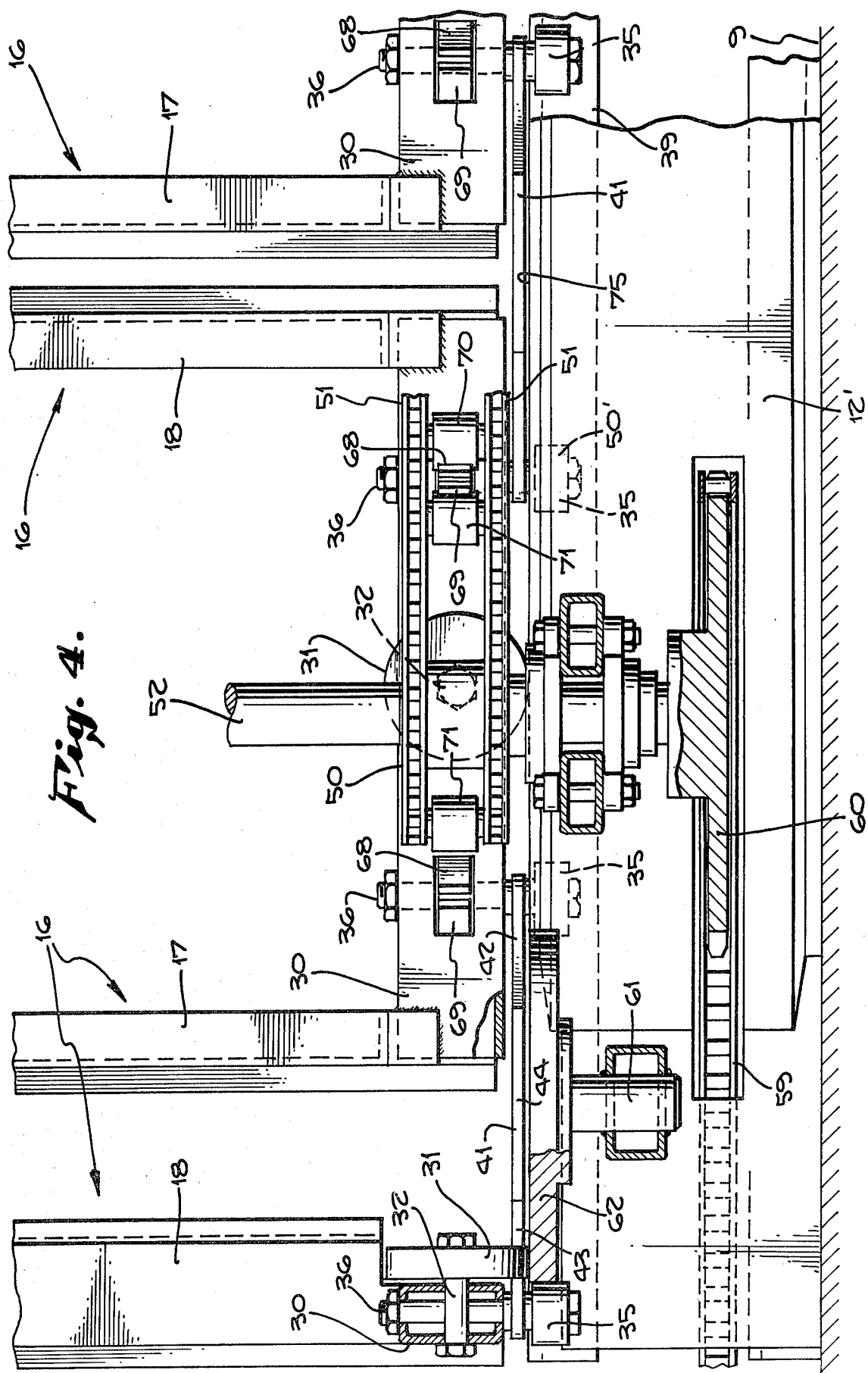

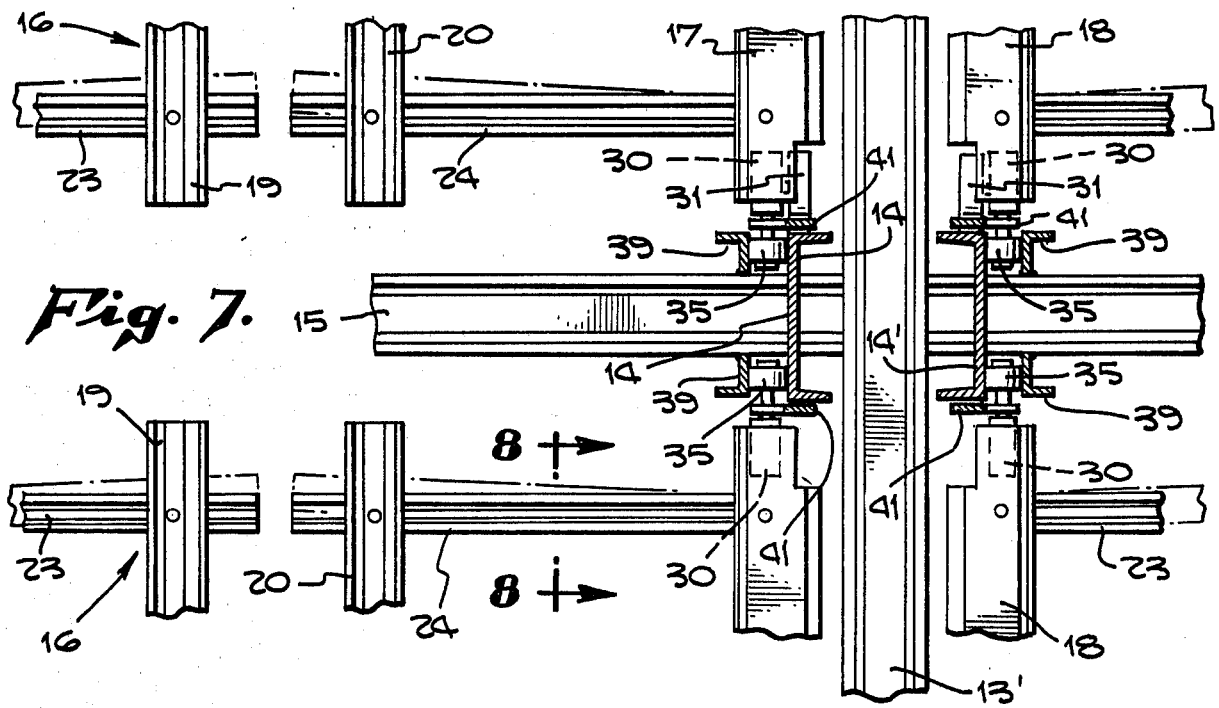
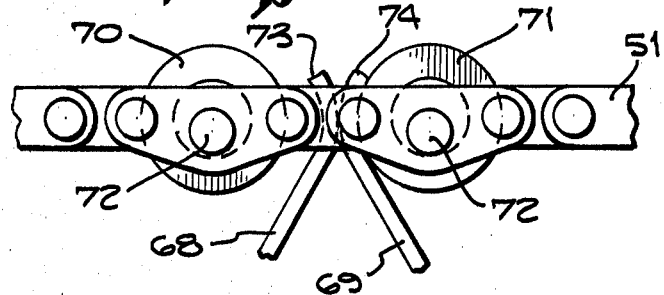
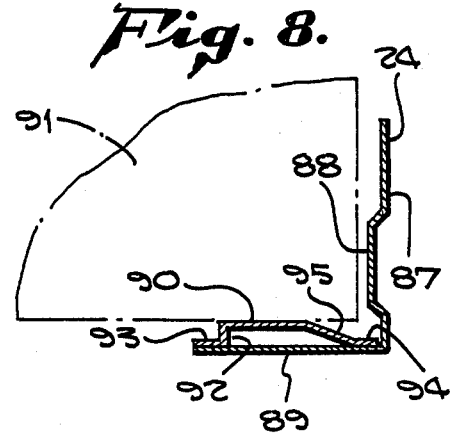
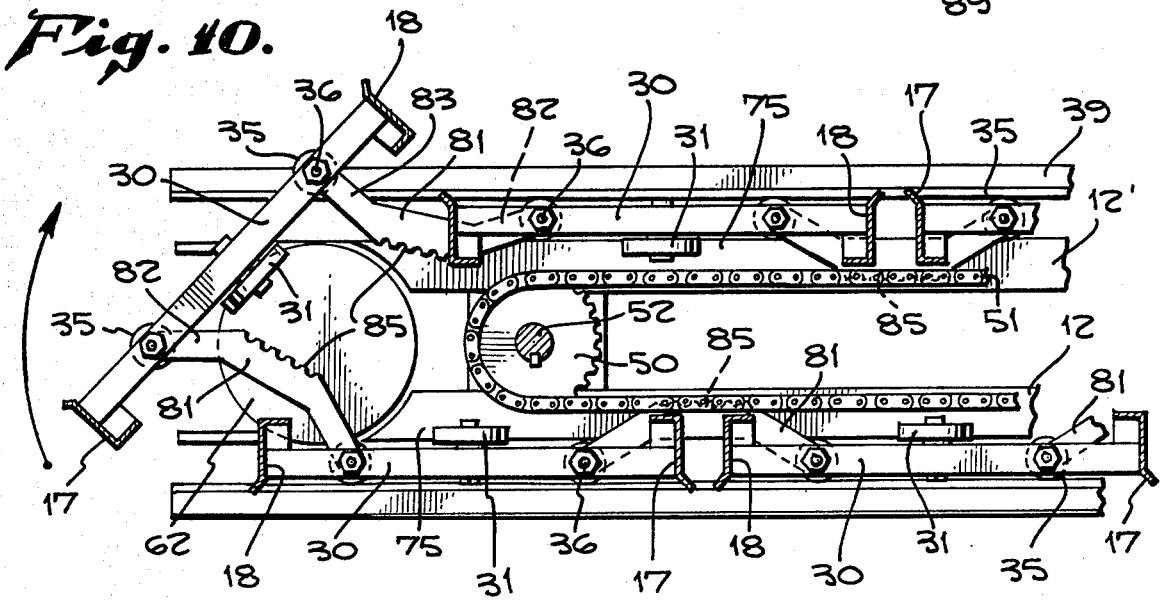

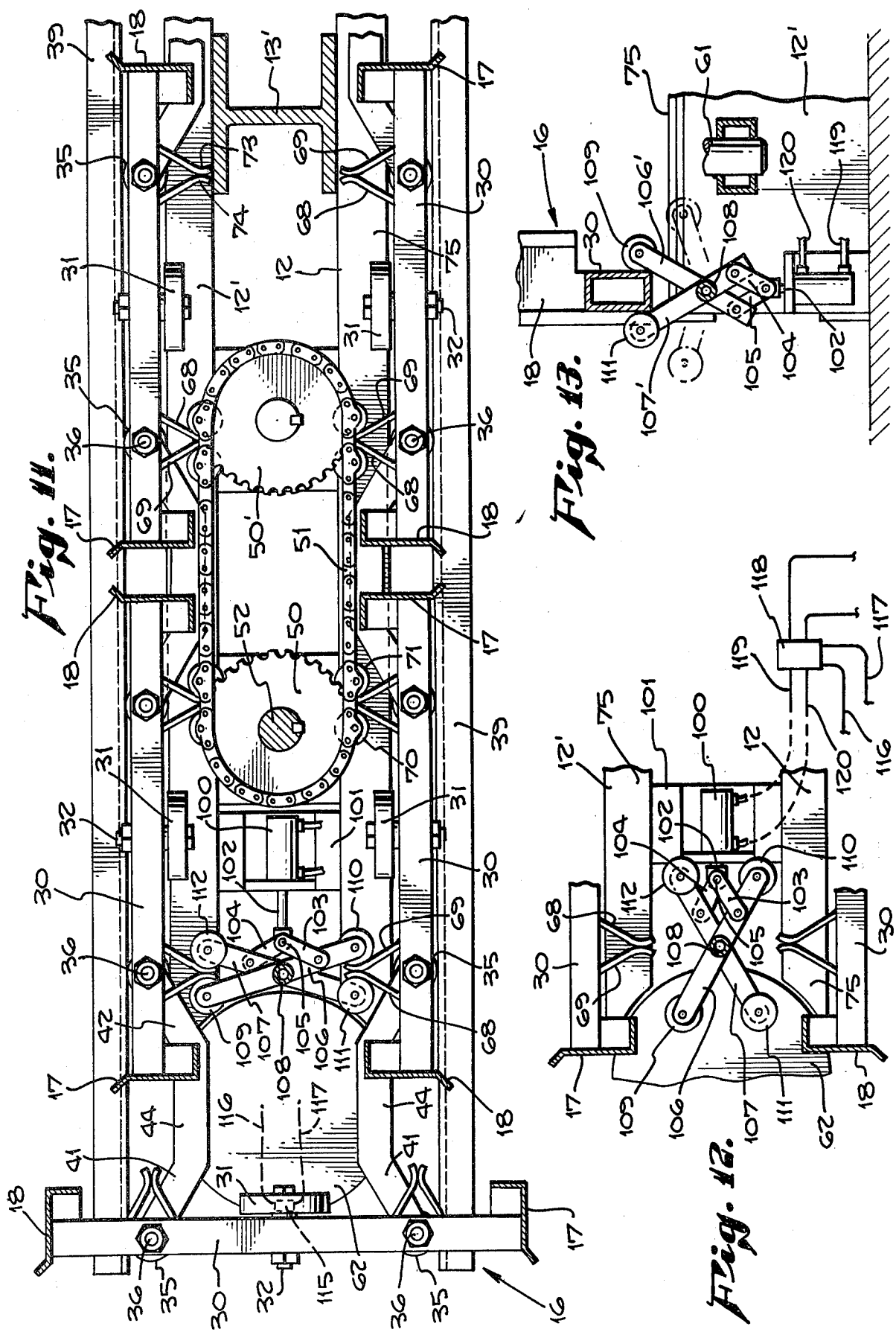

MECHANIZED RETRIEVABLE HORIZONTAL STORAGE RACK

The device here under consideration is a mechanized retrievable horizontal storage rack which consists of successive stacks of vertically spaced trays or compartments upon which articles for storage can be placed in some selected predetermined order so that upon call, and according to the location of the rack, the device is set in motion to a position where the rack in question is delivered to an unload position from which the articles stored on the rack can be removed and, if desired, other articles can be placed upon the rack. In a general way the mechanized rack is for replacement of conventional bins and shelves where articles for storage are normally inventoried and labeled so that when the need for the articles arises, the inventory clerk goes to the selected shelf in order to withdraw whatever storage article might have been placed there.

Heretofore various mechanisms have been devised for the storage of articles, both large and small, by placing them on vertically movable racks, the mechanism being such that a loading station has been provided at which the article for storage can be placed upon the rack and to which the article is returned when the need arises to remove it. Typical of mechanisms of the kind made reference to are those used as vertical parking towers for motor vehicles, as exemplified by U.S. Pat. No. 3,278,052.

Other types of mechanical inventory mechanisms have been made use of to a degree, among them being those used for delivery of specific parts used in the assembly of mechanical appliances. Some motorization has also been attempted in warehousing.

With increase in complexity of current technology, more and more individual articles are required to be inventoried and stored but in a manner such that they can be readily retrieved. Requirements for retrieval, moreover, are such that errors cannot be tolerated even under circumstances where many hundreds of individual storage items must be identified, stored, storage locations noted, and then be capable of retrieval rapidly and on short notice.

It is therefor among the objects of the invention to provide a new and improved system to provide greater storage and retrieval efficiency for items to be stored by making use of a special geometric arrangement of links.

It is further among the objects of the invention to provide a new and improved mechanized retrievable horizontal storage rack on which virtually hundreds of different items can be stored, in a manner such that any one or more of them can be delivered mechanically to a selected delivery station for ready retrieval.

Another object of the invention is to provide a new and improved mechanized retrievable horizontal storage rack wherein stacks carrying a multiple number of trays or shelves are mounted upon a traveling frame in a manner such that travel of the frame is substantially smooth throughout the entire course of its travel, thereby to disturb to a minimum degree the storage items which are carried by the trays.

Still another object of the invention is to provide a new and improved mechanized retrievable horizontal storage rack of a character such that the number of stacks can be relatively great but wherein the device is of a versatile character such that it can be designed for substantially greater or lesser quantities without departing from the established structural features and mode of operation.

Still another object of the invention is to provide a new and improved mechanized retrievable horizontal storage rack wherein stacks of trays are arranged in relatively long parallel horizontal rows located close together in order to minimize the amount of space occupied by the supporting framework and wherein the travel of the stacks is such that they can be moved in either forward or reverse direction.

Further included among the objects of the invention is to provide a new and improved mechanized retrievable horizontal storage rack wherein stacks of trays are located relatively close together in a manner such that travel of the trays in a horizontal direction can be stopped at virtually any time in order to assure that a selected stack of trays may be stopped precisely in end position where they can be readily loaded and unloaded.

Still another object of the invention is to provide a new and improved mechanized retrievable horizontal storage rack of a character such that when more storage space is needed, rack assemblies can be mounted one above the other with interconnected operating means and which are also of such character that such multiple mounting can be set in close horizontal proximity, thereby to provide maximum use of available storage space.

Still further among the objects of the invention is to provide a new and improved mechanized retrievable horizontal storage rack wherein stacks carrying a multiple number of trays can be positively indexed to stop automatically with a selected one of said stacks in a delivery position.

With these and other objects in view, the invention consists of the construction, arrangements, and combination of the various phases of the device serving as an example only of one or more embodiments of the invention, whereby the objects contemplated are attained, as hereinafter disclosed in the specification and drawings, and pointed out in the appended claims.

FIG. 4 is a fragmentary vertical sectional view on the line 4—4 of FIG. 3.

FIG. 7 is a fragmentary vertical sectional view on the line 7—7 of FIG. 1.

FIG. 8 is a fragmentary cross-sectional view on the line 8—8 of FIG. 7.

FIG. 9 is a fragmentary plan view of a portion of the chain drive.

FIG. 10 is a fragmentary horizontal sectional view similar to FIG. 3 but showing a modified form of the invention.

FIG. 11 is a fragmentary plan sectional view similar to FIG. 3 but to which the indexing expedient has been added.

FIG. 12 is a fragmentary plan sectional view of a portion of FIG. 11 showing the indexing expedient in a different position.

FIG. 13 is a fragmentary vertical sectional view of a modified form of indexing expedient.

Figure 1:
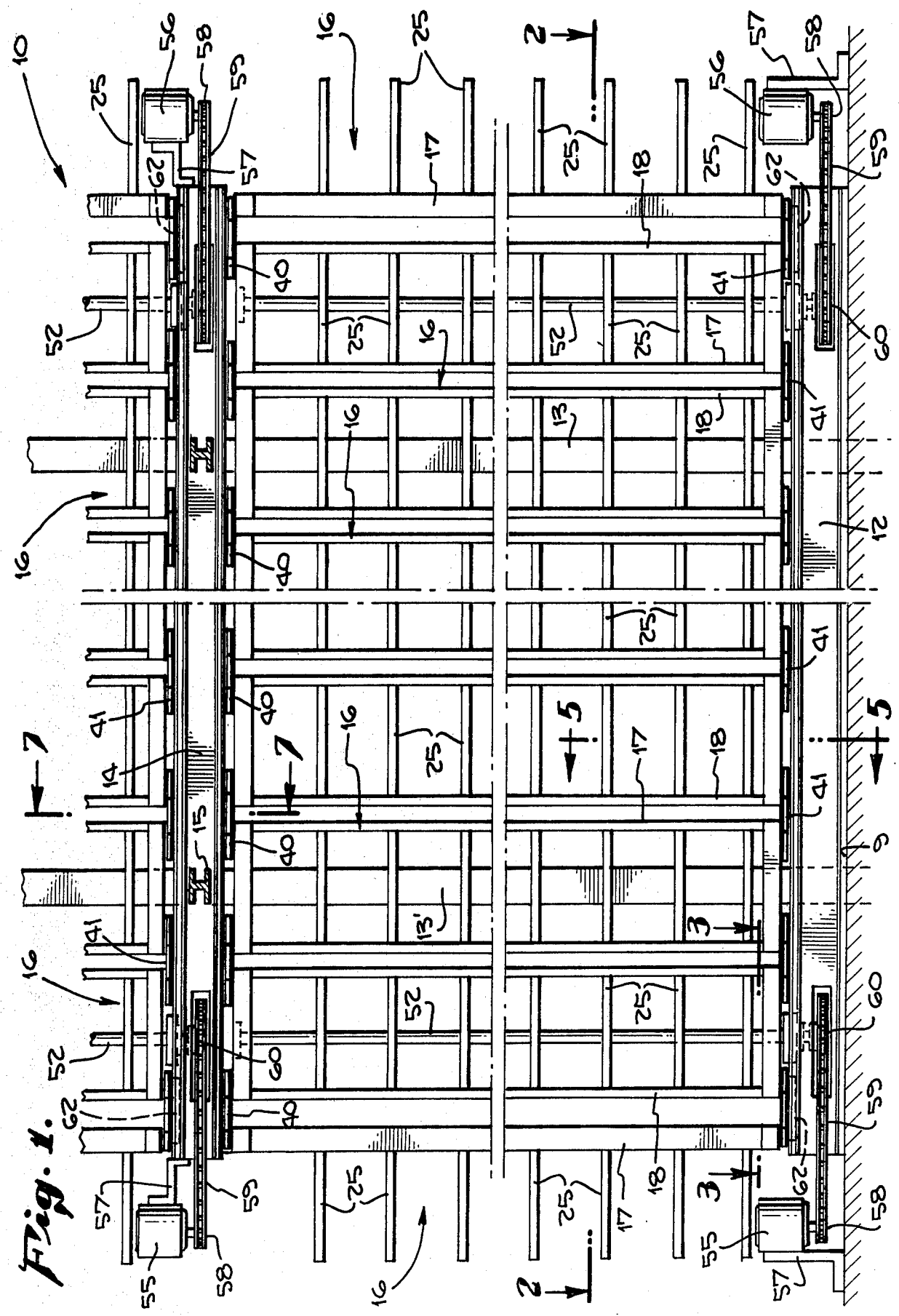
FIG. 1 is a side elevational foreshortened view of one mechanized rack assembly with a fragment of second rack assembly superimposed above it.
Figure 2:
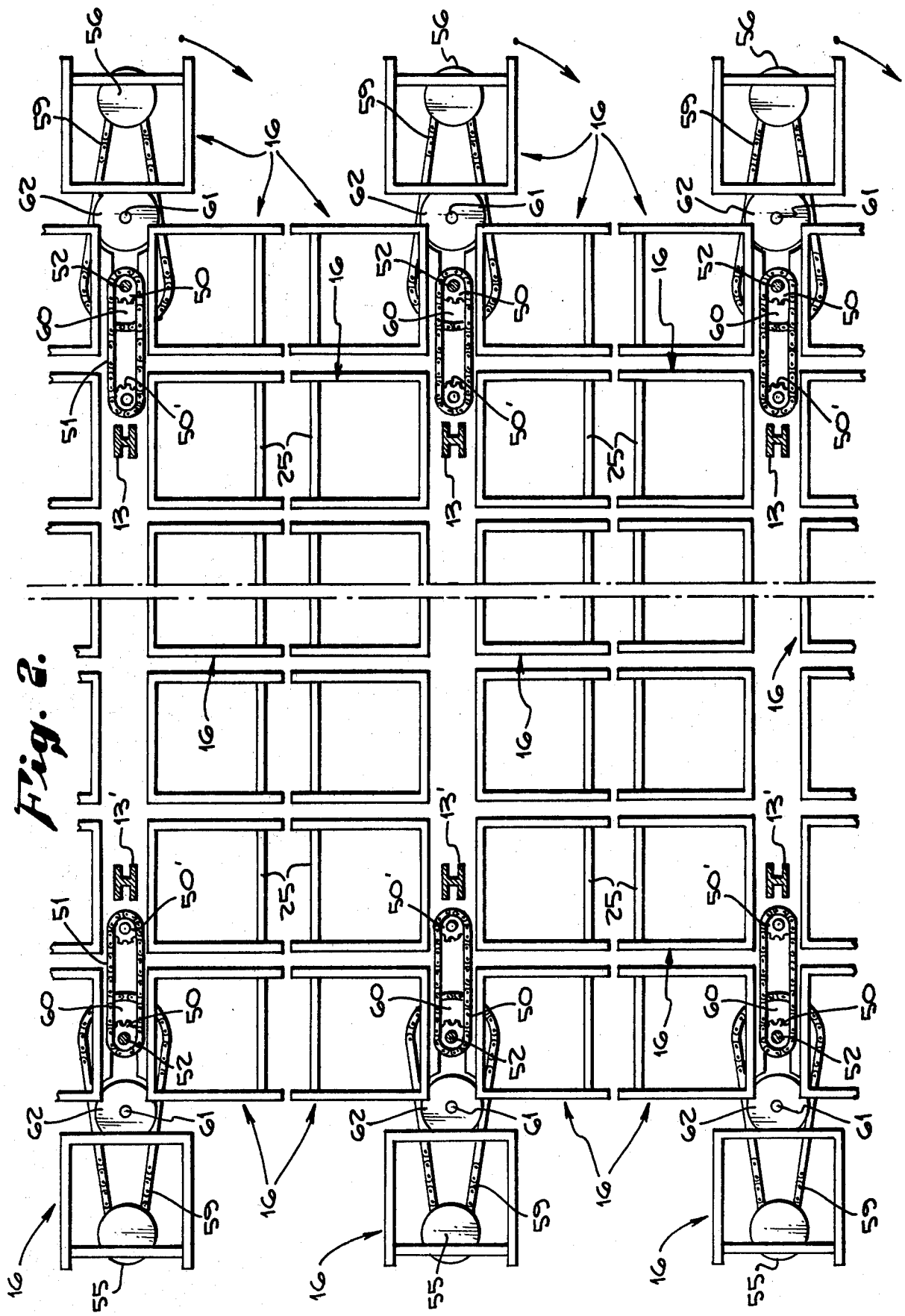
FIG. 2 is a plan view showing a multiple number of foreshortened rack assemblies located side by side.

In an embodiment of the invention chosen for the purpose of illustration there is shown in FIGS. 1 and 2 a plurality of mechanized frame assemblies 10 on a supporting surface 9. In FIG. 1 are shown two such assemblies, one on top of the other. In FIG. 2 three of such assemblies are shown side by side. Although the length and height of each frame assembly is not critical, it should be appreciated that the design is one contemplating a length of as much as 175 feet, a width of about 6 feet 7 inches, and an overall height of 50 feet when three such assemblies are stacked one on top of the other. The dimensions suggested contemplate conventional palettes used on the trays where the palettes may be about 26 inches wide and about 32 inches deep. A typical acceptable spacing between trays may be approximately 1 foot 3 inches, but can be varied to accommodate various types of storage items.

Each mechanized rack assembly employs a horizontally elongated stationary frame 11 consisting in the main of laterally spaced channel sections 12 and 12' at the lower end, columns 13, 13', and channel sections 14, 14' adjacent the tops of the columns. In view of the dimensions heretofore mentioned, it can be appreciated that channel sections may be spliced in order to cover the entire distance and that there may be columns such as the columns 13, 13' in appreciably greater number throughout the entire distance. Where there are multiple tiers of such frame assemblies 10, the channel sections 14, 14' serve both as upper channels for the lower frame assembly 10 and lower channels for the upper frame assembly 10. On those occasions as in FIG. 2 where there are a multiple number of frame assemblies in side by side relationship, tie beams 15, 15' may be employed extending from the channel sections 14, 14' of one frame assembly to corresponding channel sections in adjacent frame assemblies, as shown in FIGS. 1 and 7.

For each of the mechanized rack assemblies 10 there is provided a multiple number of vertically elongated stacks 16 of storage stations. The overall dimensions of each stack are preferably identical with respect to every other stack, each consisting in the main of a movable frame embodied in rear vertical columns 17 and 18 and forward vertical columns 19 and 20. Interconnecting the rear vertical columns are transverse beams 21. Transverse beams 22 interconnect the forward vertical columns 19 and 20, there being provided as many transverse beam connections as there are trays in each respective stack. Extending from the rear vertical column 17 to the forward vertical column 19 is a beam 23. A similar beam 24 extends from the vertical column 18 forwardly to the vertical column 20. In a descriptive sense, the beams 23, 24 and corresponding transverse beams 21 and 22 form a tray for the reception of a conventional palette, not shown. Trays have been indicated by the reference character 25 in FIG. 1 and elsewhere. The forward vertical columns 19 and 20 have been omitted from FIG. 1 in the interest of clarity.

The trays 25 may preferably be tilted slightly upward at the outside end to prevent stored objects from sliding off during travel, as shown by broken line in FIG. 7.

Figure 5:
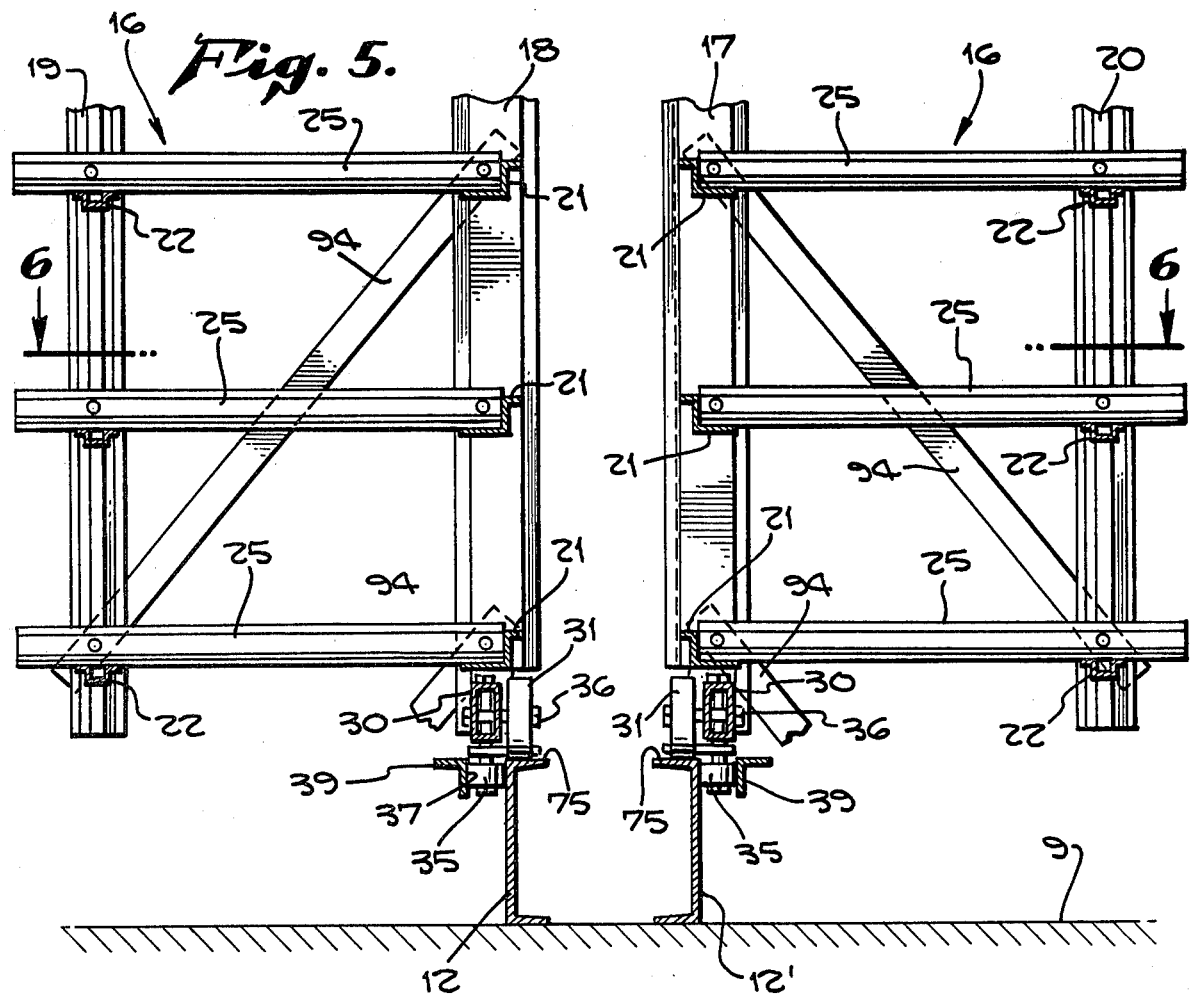
FIG. 5 is a fragmentary vertical sectional view on the line 5—5 of FIG. 1.

Because each of the stacks 16 with the many trays 25 must be built to carry considerable weight as they travel around the stationary frame 11, the lowermost ends of the stacks are built up, as shown in FIGS. 4 and 5. For this purpose a suitable structure, such for example as a hollow beam 30 extends transversely from the bottom of the rear vertical column 17 to the bottom of the rear vertical column 18. A roller 31 carried upon an axle 32 serves to support the entire weight of the stack on which it is mounted.

To keep the stacks in line as they travel throughout the length of the stationary frame 11, each stack is provided with a roller guide 35 at the lower end of an axle 36 which is anchored to the hollow beam 30, as shown to advantage in FIG. 4. To accommodate the roller guides there are provided guideways 37 and 38 on the outer sides of the respective channel sections 12 and 12' as shown in FIG. 5. The guideways are formed by angle sections 39 appropriately anchored to the respective channel sections in spaced relation, the space being wide enough to admit the roller guides 35.

The movable frames embodied in the stacks 16 are adapted to be linked together to form, in effect, an endless chain. The linkage is made at the top and bottom of each stack by use of upper links 40 and lower links 41. Note, for example, in FIG. 3 where lower links 41 are shown, that for the upper course of the links 41 a right end piece 42 is pivotally secured to the hollow beam 30 by the same axle 36 which is employed to mount the roller guide 35. Similarly a left end piece 43 is secured to the corresponding hollow beam 30 by a similar axle 36. A mid-portion 44 of the link projects inwardly toward the stationary frame 11. Similar connections are provided for the upper links 40 which together with accompanying roller guides and axles are identical to bottom links 41, roller guides 35 and axles 36. With all of the stacks interconnected by links in the manner described, the stacks in fact act as an endless chain in their travel in a horizontal direction along the opposite sides of the stationary frame 11 and around the ends.

Figure 3:
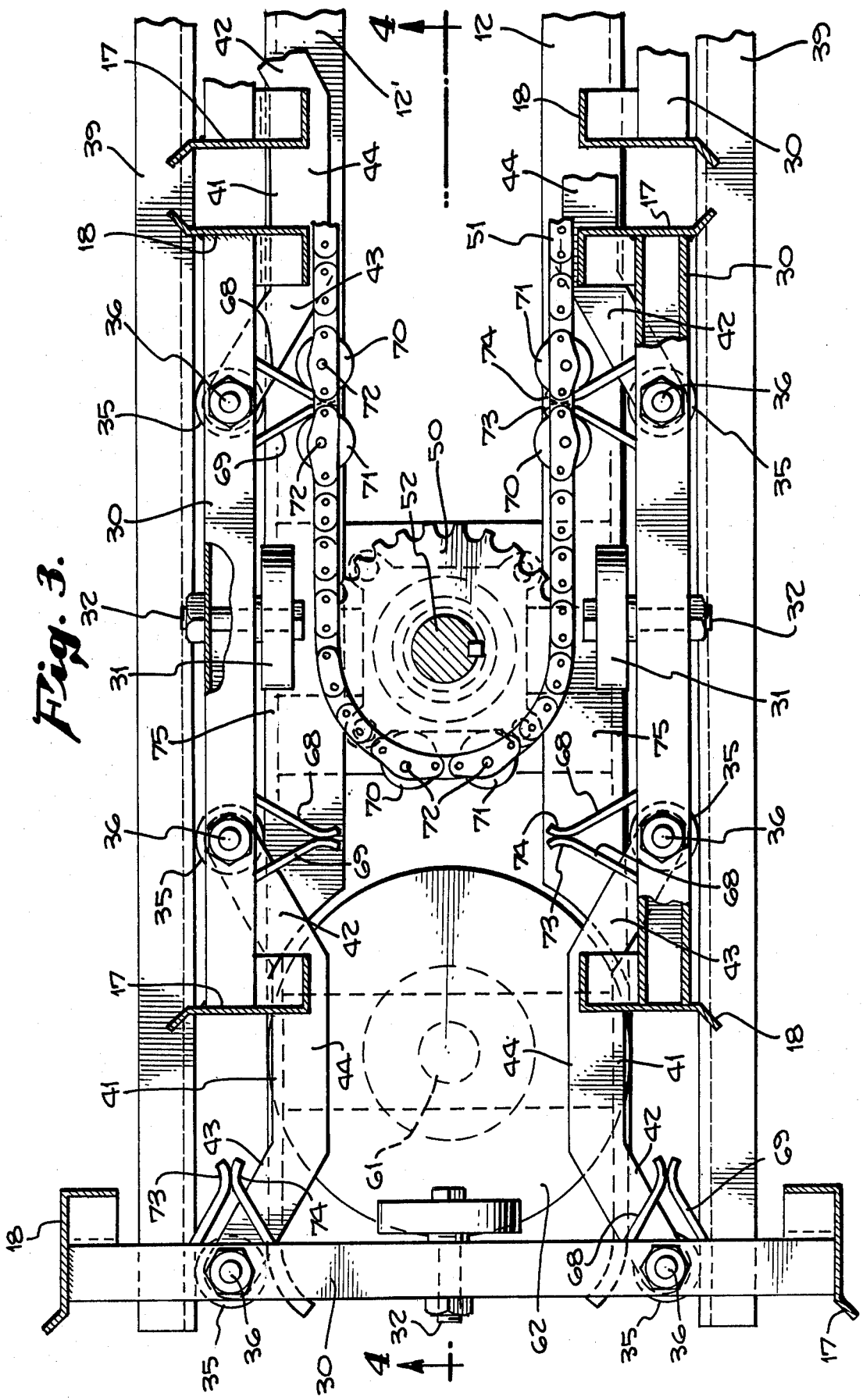
FIG. 3 is a fragmentary plan sectional view on the line 3—3 of FIG. 1 drawn to larger scale.
Figure 6:
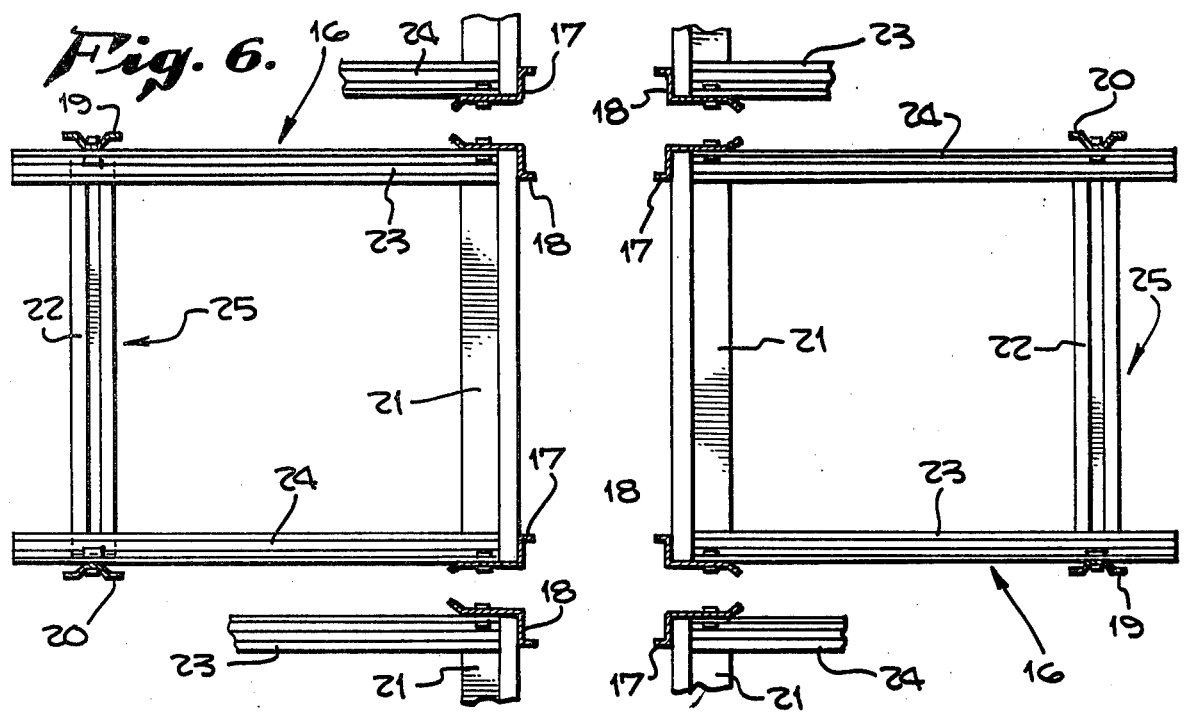
FIG. 6 is a fragmentary plan sectional view on the line 6—6 of FIG. 5.

For driving what amounts to an endless chain of stacks, there are provided sprockets 50, one of which is shown in FIG. 3 and two of which are shown in FIGS. 1 and 2 for each of the stationary frames. Extending around the sprockets 50 and an accompanying idler sprocket 50' at each end is an endless chain loop 51. In point of fact, the sprockets 50 and 50' may be provided as a pair with a second pair parallel to the first pair, each carrying its own endless chain loop 51. For each sprocket there is provided a vertically extending shaft 52, the shaft being of such length as to extend to the top of the lower mechanical frame assembly 10. There is a separate drive for the mechanical frame assembly immediately above, although portions of the frame assembly may be common to both.

In consideration of the appreciable length of the frame assembly, previously made reference to, there may be provided for the longer assemblies two motors 55 and 56 mounted at opposite ends on appropriate brackets 57 on the same supporting surface 9. Each motor is provided with a drive sprocket 58 and drive chain 59. A driven sprocket 60 on one or another of the shafts 52 accommodates the drive chain 59, as shown appropriately in FIG. 4. By having the motors 55 and 56 operate synchronously, both sprockets 60 are accordingly driven at the same speed to motivate the adjacent endless chain loop 51 and have a common affect upon the endless chain of traveling frames. Motors on long units can position each end independently within the slot designed into the connections.

In the arrangement proposed, and as shown in FIG. 2, the axis of rotation of the motor 55 and sprocket 60 is in alignment with an axle 61 which supports a rotating platform 62 in order to maintain the mechanized frame assembly 10 and all of its appurtenances within the relatively narrow longitudinal confines. By preserving this arrangement, a multiple number of mechanized frame assemblies 10 can be located side by side in the relationship shown in FIG. 2. The roller 31 travels over the platform 62 during the transition from one side to the other at the stacks 16.

In order to take power from the endless chain 51 for moving the stacks throughout their path of travel, there are provided pairs of relatively rigid fingers 68 and 69 at each location of the roller guide 35 and its axle 36. As previously noted, this is also the pivot location of the respective end of a link 41.

As best seen in FIG. 4, upper and lower sections of the endless chain 51 have mounted between them pairs of eccentrically mounted semi-resilient cams 70, 71 at spaced locations throughout the extent of the endless chain. The cams, mounted on pins 72, are spaced apart a short distance from each other, the space being wide enough to accommodate arcuate ends 73, 74 of the respective fingers 68, 69. As the lower bight, as viewed in FIG. 3, of the endless chain loop 51, passes in a direction from right to left with the fingers 68, 69 engaged between the cams 70, 71, the respective stack is carried along in the same direction. As those cams 70, 71 pass around the sprocket 50, the fingers disengage from the cams while the cams continue to travel around the circumference of the sprocket 50. The fingers in turn continue to travel with the stack as shown by fingers attached to the hollow beam 30 at the end of the stationary frame. Other cams engaged with fingers of other stacks along the stationary frame continue to provide movement for the stacks around the frame. As fingers 68, 69 approach the upper bight of the endless chain loop 51, traveling in a direction from left to right, the fingers reengage those of the cams 70, 71 which meet the fingers in a timed sequence, the arcuate ends 73 sliding into the space between the cams where they remain for the balance of travel in a left-right direction along the corresponding side of the stationary frame.

During travel of the stacks around the stationary frame in a manner described, the rollers 31 roll along the top flange 75 of the frame, serving as a track.

Of special consequence in the path of travel of the rollers 31 is the rotating platform 62. The platform is in effect an idler in rotating about the axle 61 in that when the roller 31 enters upon the top surface of the rotating platform, both the platfrom and the roller are free to rotate. During the path of travel of the roller around the end of the stationary frame while in position on the top of the rotating platform 62, it may for a part of its path of travel pivot upon the platform and actually rotate in reverse direction for a very small portion of its path of travel. The mounting of the platform is made such as to provide adequate support for the stack of trays and whatever load may be imposed upon it during the path of travel around the end of the stationary frame.

After passing over the platform, the roller 31 then proceeds to roll onto the track on the opposite side of the stationary frame, as exemplified by the top flange 75 of channel section 12', as seen in FIGS. 3, 4 and 5. In the module immediately above the rollers 31 roll on flanges of corresponding channel sections 14 and 14'.

In a modified form of the invention shown in FIG. 10, links 81 are slightly different in construction from the links 41 previously made reference to. The links 81 have, as viewed on the upper side of FIG. 10, a right end piece 82 and a left end piece 83. The end pieces are pivotally supported by the same axles 36 of corresponding hollow beams 30.

On this occasion mid-portion 84 of the link, in each instance, is provided with a rack 85 presenting teeth adapted to engage the endless chain loop 51 which may comprise either a single endless chain portion or a double endless chain portion as shown in FIG. 4. By providing racks with teeth as described, the racks can readily engage one bight or another of the endless chain loop 51, then leave the chain as the chain passes around the sprocket 50, and subsequently reengage the chain after the stack travels around the rotating platform 62 and commences its path of travel from left to right along the opposite side of the stationary frame, as viewed in FIG. 10.

In order to minimize the overall weight of the various stacks, resort has been had to a formed beam 23, 24, as viewed in FIG. 8. In such formed section, an upper leg 87 is provided with a stiffening groove 88 to give the leg 87 appreciable rigidity, although formed of relatively thin sheet material. A lower leg 89 has on its upper face a sheet section 90 spaced from the leg 89, the sheet section 90 providing a specially hardened wear surface to withstand the wear of palettes 91 which may slide onto and off of the tray from time to time. The sheet section 90 has a downwardly turned vertical flange 92 at one edge, joined to a horizontal flange 93, the flange 93 being welded or otherwise anchored to the leg 89. On the opposite side there is a horizontal flange 94, likewise welded or appropriately anchored to the leg 89 at its junction with the upper leg 87, an oblique portion 95 being provided for joining the flange 94 with the raised sheet portion 90. Accordingly, the sheet section and its flanged appurtenances provides not only a desirable longwearing surface, but also an appreciable stiffening effect for the beam 23, or 24, as the case may be. In other words the tubular sections formed by the two sections 23, 24 provide torsional stiffness and transfer eccentric loads to the rear member 21.

Further still, an eccentric moment generated at the loaded area of the beams 23, 24 is passed to the rear transverse beam 21 as a bending member by torsion of the beams 23, 24 in respective inward clockwise and counterclockwise directions.

As an additional economic expedient, diagonal braces 94, 94' at the sides of the stacks may be loosely attached at one end of each to permit ready removal and reattachment. When removed, the stack can be collapsed with an accordian-like fold for shipment and then readily reassembled in the field.

In order to make certain that each of the stacks 16 in its turn is precisely positioned at the end of the stationary frame 11 in a position for unloading and loading, an indexing expedient is provided. For this to be accomplished, there is provided a clamping expedient taking the form of a hydraulic cylinder 100, mounted on a bracket 101 extending between channel sections 12 and 12' of the stationary frame 11. A piston 102 is attached to articulating links 103 and 104 by means of a pin 105. A pair of pivoting arms 106 and 107 are arranged to pivot about a pivot shaft 108. The link 103 is pivotally secured to the arm 106 and the link 104 to the arm 107.

Roller clamps 109, 110, 111 and 112 are provided at repectively opposite ends of the arms 106 and 107.

To properly trigger actuation of the hydraulic cylinder 100, there may be provided a switch 115 appropriately mounted on the stationary frame 11 by conventional means connected by leads 116 and 117 to the control for a valve 118, adapted to direct hydraulic fluid under pressure through one or another of the hydraulic lines 119, 120 to the hydraulic cylinder 100.

The arrangement is such that when the switch 115 is actuated by reason of the fact that one of the stacks 16 is precisely positioned at the end of the stationary frame, the valve 118 is activated in a manner such that the piston 102 is extended from the position of FIG. 12 to the position of FIG. 11. In the latter position, the roller clamps 110 and 111 engage the lower of the fingers 68 and 69 while the roller clamps 109 and 112 engage the upper of the fingers 68 and 69. Engagement as described holds the chain of stacks from further movement, thereby anchoring the end-most stack 16 in proper loading and unloading position.

By appropriate conventional release means, when the stacks are again to be moved in the manner provided, the switch 118 is again activated to shift direction of flow in the hydraulic lines, causing retraction of the piston 102 from the position of FIG. 12 to the position of FIG. 11, thereby to release the roller clamps from engagement with the fingers.

As an alternative, and as shown in FIG. 13, substantially the same arrangement of hydraulic cylinder and arms 106' and 107' can be employed to engage directly with a portion of the stack 16 in endmost position. On this occasion when the hydraulic cylinder 100 acts to withdraw the piston 102, the arms 106' and 107' are collapsed to the positions of FIG. 13 in which they engage opposite sides of the hollow beam 30, thereby to anchor it in its endwardly facing position. When the stack is to be released for continued travel, movement of the piston 102 in the opposite direction, namely, upwardly, as shown in FIG. 13, serves to separate the roller guides to the broken line positions of FIG. 13. An effective indexing system of the last defined type could be implemented by employment of two hydraulic cylinders 100 with the accompanying links and arms, one on each side of the stationary frame so as to engage respective ends of the hollow beam 30.

While particular embodiments of the present invention have been shown and described, it will be obvious to those skilled in the art that changes and modifications may be made without departing from the invention in its broader aspects, and therefore, the aim of its appended claims is to cover all such changes and modifications as fall within the true spirit and scope of the invention.

Having described the invention, what is claimed as new in support of Letters Patent is as follows:

1. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprising a stack of storage stations of selected horizontal breadth and depth comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, the horizontal distance between stacks in back to back relationship on opposite sides of said endless chain of traveling frames being less than the horizontal depth of said stacks.

2. A mechanized rack assembly as in claim 1 wherein there are separate elongated guideways on each side of the stationary frame in spaced parallel relationship throughout their lengths and respectively adjacent upper and lower ends of said traveling frames and guides at upper and lower ends of the traveling frames in guided association with the respective guideways.

3. A mechanized rack assembly as in claim 1 wherein there is an endless drive chain on the stationary frame having opposite parallel portions included in the operating drive connection of said motor at a location spaced inwardly of the adjacent end of said endless chain of said traveling frames and drive take-off means on said traveling frames having intermittent drive connections with said opposite parallel portions of said endless drive chain whereby said chain of traveling frames is driven by said endless drive chain.

4. A mechanized rack assembly as in claim 3 wherein each said drive take-off means is located at the pivot connection of the lower of said links to the traveling frame.

5. A mechanized rack assembly as in claim 3 wherein said drive take-off means comprises finger members on the traveling frames for intermittent engagement with said endless drive chain.

6. A mechanized rack assembly as in claim 3 wherein said drive take-off means comprises sets of teeth on the traveling frames adapted to engage said endless drive chain.

7. A mechanized rack assembly as in claim 1 wherein there is a second mechanical rack assembly above and coincident in width and length with the first identified rack assembly, the upper end of the stationary frame for said first rack assembly and the lower end of the stationary frame of said second rack assembly having elongated guideways in back to back relationship.

8. A mechanized rack assembly as in claim 7 wherein the operating drive connection of said second rack assembly is in alignment with the operating drive connection of said first identified rack assembly.

9. A mechanized rack assembly as in claim 1 wherein there is an indexing device in operative association with the stationary frame comprising locking means having an attitude of releasable engagement with a portion of the storage train when a selected one of said traveling frames is in said delivery position, power means for moving said locking means into and out of said releasable engagement and an actuator for said power means including trip means responsive to movement of the storage train to a stage wherein the selected one of said traveling frames is in said delivery position.

10. A mechanized rack assembly as in claim 1 wherein the said distance between stacks is less than one half the horizontal depth of said stacks.

11. A mechanized rack assembly as in claim 1 wherein said motor is at a location endwardly outward of said endless chain of traveling frames.

12. A mechanized rack assembly as in claim 1 wherein said horizontally extending support comprises spaced parallel side elements and rotatably mounted end elements intermediate adjacent ends of said side elements.

13. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the staionary frame, and a rolling support on each traveling frame adapted to ride on said horizontally extending support, a motor having an operating drive connection with said chain, each traveling frame comprising a stack of storage stations of selected horizontal breadth and depth comprising a multiple number of vertically spaced outwardly open trays for reception thereon of storage items, said stacks having spaced opposite side faces and a rear face joining said side faces at end edges of said rear face, said operating drive connection and said chain being adapted to be halted with a selected one of said stacks and its trays in a delivery position at one end of the stationary frame with trays open outwardly for removal and loading of storage items, said link means comprising a pair of respective upper and lower link members intermediate rear faces of each two adjacent frames, each link member having a first pivot connection to one of said two frames and a second pivot connection to the other of said two frames, each link member having a mid-portion displaced to an inwardly extended position relative to the stationary frame, the pivot connections between the link members and the adjacent frames being at a location spaced inwardly of the end edges of the rear face of the corresponding frame.

14. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprising a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, said rolling support comprising a single roller for each traveling frame having a horizontal axle adjacent the bottom of the traveling frame mounted intermediate opposite vertical edges of said traveling frame.

15. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprising a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, said rolling support comprising a roller for each traveling frame having a horizontal axle adjacent the bottom of the traveling frame mounted intermediate opposite vertical edges of said traveling frame, there being a track along each long side of the horizontally extending support and a rotating platform at each end of the horizontally extending support intermediate adjacent ends of the tracks on which said rollers are adapted to travel.

16. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, a motor having an operating drive connection with said chain, each traveling frame comprising a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, said link means comprising a pair of respective upper and lower link members intermediate rear faces of each two adjacent frames, each link member having a first pivot connection to one of said two frames and a second pivot connection to the other of said two frames, there being an endless drive chain on the stationary frame, an elongated guideway on each side of the stationary frame adjacent respective upper and lower ends of said traveling frames, guides at respective upper and lower ends of the traveling frames in guided association with the respective guideways and a drive take-off means on the traveling frames for each guide having an intermittent drive connection with said endless drive chain, said intermittent drive connection being out of engagement during travel of said traveling frames from one long side of said storage train to the other.

17. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprising a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, each of said traveling frames comprising a pair of inner columns on the side of said traveling frame adjacent the stationary frame, said trays being anchored to said columns and comprising brackets extending from said columns outwardly away from said stationary frame.

18. A mechanized rack assembly as in claim 17 wherein there is a pair of outer columns on the side of said traveling frame remote from said stationary frame, said brackets being secured to said outer columns.

19. A mechanized rack assembly as in claim 17 wherein each of said brackets comprises a beam having side and bottom legs with an effective tubular cross sectional shape and disposed in an angular cross-sectional configuration, said bottom leg including a wear surface of sheet material spaced upwardly from said bottom leg and having side portions of said sheet material anchored to said bottom leg.

20. A mechanized rack assembly as in claim 19 wherein there is a longitudinally extending stiffening groove on each side leg.

21. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprising a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, there being an indexing device in operative association with the stationary frame comprising locking means having an attitude of releasable engagement with a portion of the storage train when a selected one of said traveling frames is in said delivery position, power means for moving said locking means into and out of said releasable engagement and an actuator for said power means including trip means responsive to movement of the storage train to a stage wherein the selected one of said traveling frames is in said delivery position, the portion of said storage train with which said locking means has its attitude of releasable engagement comprising one of said traveling frames.

22. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprising a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, there being an indexing device in operative association with the stationary frame comprising locking means having an attitude of releasable engagement with a portion of the storage train when a selected one of said traveling frames is in said delivery position, power means for moving said locking means into and out of said releasable engagement and an actuator for said power means including trip means responsive to movement of the storage train to a stage wherein the selected one of said traveling frames is in said delivery position, said traveling frame comprising a transverse base member for said rolling support and wherein said portion of the storage train with which said locking means has its attitude of releasable engagement comprises a portion of said base member of the traveling frame.

23. A mechanized rack assembly comprising a horizontally elongated stationary frame, a storage train comprising a multiple number of vertically elongated traveling frames including link means for movably linking said traveling frames together in the form of an endless chain of such traveling frames, said stationary frame including a horizontally extending support for traveling frames of said chain extending along sides and around ends of the stationary frame, and a rolling support on each traveling frame adapted to ride on said horizontally extending support, a motor having an operating drive connection with said chain, each traveling frame comprisong a stack of storage stations comprising a multiple number of vertically spaced outwardly open trays for reception thereon of storage items, said operating drive connection and said chain being adapted to be halted with a selected one of said stacks and its trays in a delivery position at one end of the stationary frame with trays open outwardly for removal and loading of storage items, there being an endless drive chain on the stationary frame included in the operating drive connection of said motor, drive take-off means on said traveling frames having intermittent drive connections with said endless drive chain and the portion of said storage train with which said locking means has its attitude of releasable engagement comprising said take-off means.

* * * * *